United States Patent [19]

Sugano

[11] Patent Number: 4,617,841
[45] Date of Patent: Oct. 21, 1986

[54] HYDRAULIC CONTROL SYSTEM FOR AUTOMATIC TRANSMISSION WITH SHOCKLESS 4-2 SHIFTING

[75] Inventor: Kazuhiko Sugano, Zama, Japan

[73] Assignee: Nissan Motor Co., Ltd., Yokohama, Japan

[21] Appl. No.: 581,508

[22] Filed: Feb. 17, 1984

[30] Foreign Application Priority Data

Feb. 28, 1983 [JP] Japan .................................. 58-30691

[51] Int. Cl.$^4$ ...................... B60K 41/08; F16H 57/10
[52] U.S. Cl. ...................................... 74/869; 74/864; 74/759
[58] Field of Search ................ 74/869, 868, 867, 865, 74/759, 758

[56] References Cited

U.S. PATENT DOCUMENTS

| | | | |
|---|---|---|---|
| 3,656,373 | 4/1972 | Shimosaki | 74/869 |
| 3,707,890 | 1/1973 | Ito | 74/868 |
| 3,710,638 | 1/1973 | Sakai | 74/867 X |
| 3,728,915 | 4/1973 | Clark | 74/868 |
| 3,747,439 | 7/1973 | Uozumi et al. | 74/869 |
| 3,832,915 | 9/1974 | Hiramatsu | 74/869 |
| 3,896,685 | 7/1975 | Shellman | 74/869 |
| 4,106,369 | 8/1978 | Taga | 74/869 |
| 4,186,627 | 2/1980 | Kuramochi | 74/869 |
| 4,309,919 | 1/1982 | Iwanaga et al. | 74/867 |
| 4,334,441 | 6/1982 | Iwanaga et al. | 74/869 |
| 4,334,442 | 6/1982 | Iwanaga et al. | 74/869 |
| 4,413,536 | 11/1975 | Whitney et al. | 74/869 |
| 4,418,587 | 12/1983 | Kaufmann | 74/867 |
| 4,446,759 | 5/1984 | McCrary | 74/867 |
| 4,467,675 | 8/1984 | Sugano et al. | 74/869 |
| 4,474,084 | 10/1984 | Sugano et al. | 74/869 |
| 4,476,747 | 10/1984 | Kawamoto | 74/869 |

FOREIGN PATENT DOCUMENTS

| | | |
|---|---|---|
| 0059427 | 8/1982 | European Pat. Off. . |
| 0107155 | 8/1980 | Japan .................................. 74/867 |
| 0131458 | 8/1983 | Japan .................................. 74/869 |
| 2032025 | 4/1980 | United Kingdom . |
| 2108604 | 5/1983 | United Kingdom .................. 74/869 |

*Primary Examiner*—Kenneth J. Dorner
*Assistant Examiner*—Stephen B. Andrews
*Attorney, Agent, or Firm*—Schwartz, Jeffery, Schwaab, Mack, Blumenthal & Evans

[57] ABSTRACT

Disclosed herein is a hydraulic control system for an automatic transmission which is shiftable from a 4th speed ratio to a 2nd speed ratio. A 2-3 shift valve (24) has a first port (124g) communicating with a first friction unit (C3) and a second port (124h) communicating with a fluid conduit (412) supplied with an actuating fluid pressure. The first port (124g) is allowed to communicate with the first port (124h) when the 2-3 shift valve (24) assumes a downshift position thereof. A 4-3-2 changeover valve (23) is provided which urges a 2-3 shift valve (22) toward a downshift position thereof when a fluid pressure in the first port (124g) increases beyond a predetermined value.

4 Claims, 6 Drawing Figures

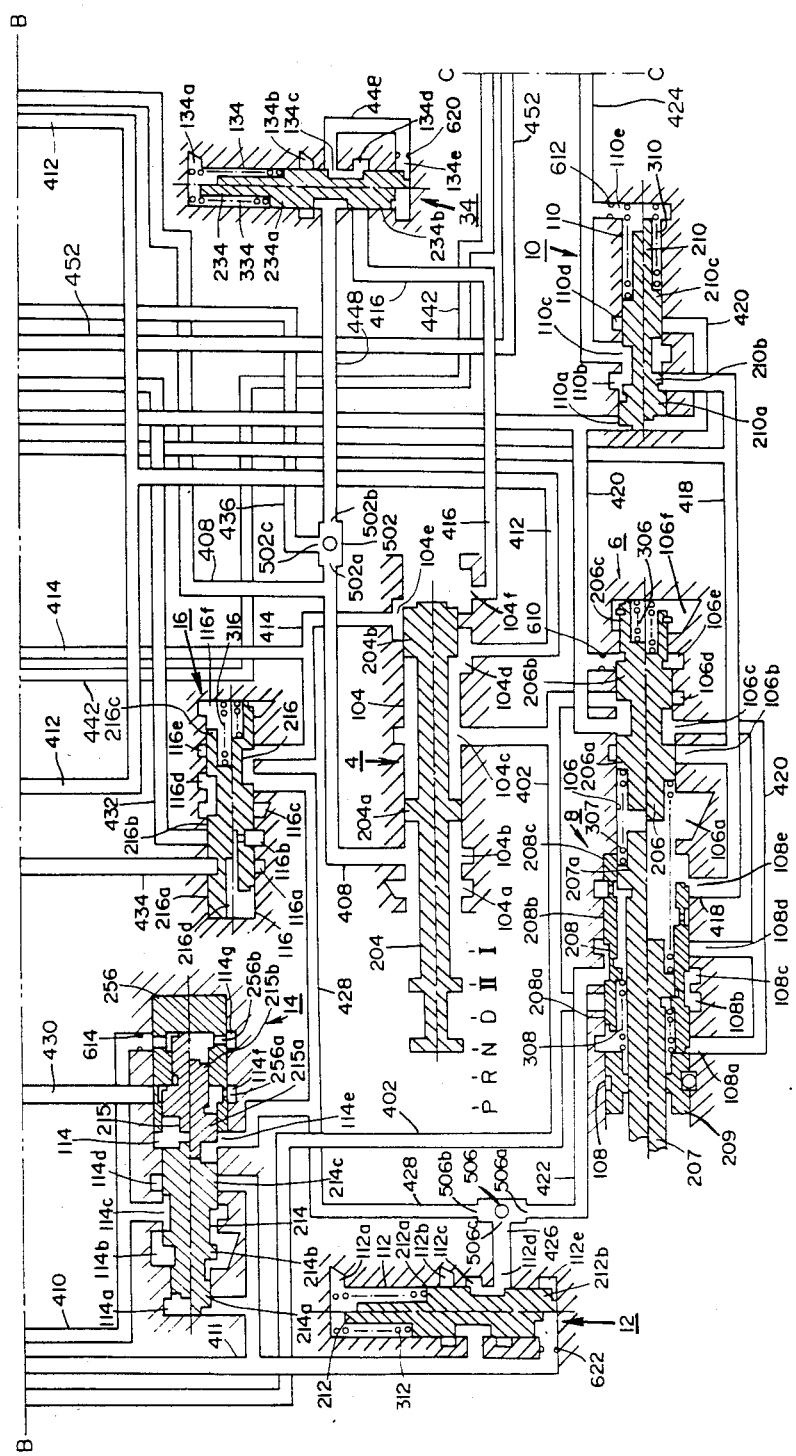

HYDRAULIC CONTROL SYSTEM FOR AUTOMATIC TRANSMISSION WITH SHOCKLESS 4-2 SHIFTING

CROSS-REFERENCES TO RELATED APPLICATIONS

References are made to the following related copending applications, filed by the same applicant as that of the present application; U.S. patent application Ser. No. 494,647, filed May 16, 1983, now U.S. Pat. No. 4,561,528; U.S. patent application Ser. No. 507,228, filed June 23, 1983; U.S. patent application Ser. No. 518,413, filed July 29, 1983, now U.S. Pat. No. 4,563,918; U.S. patent application Ser. No. 518,540, filed July 29, 1983, now U.S. Pat. No. 4,539,870; U.S. patent application Ser. No. 518,681 filed July 29, 1983, now U.S. Pat. No. 4,532,829; U.S. patent application Ser. No. 518,745 filed July 29, 1983, now U.S. Pat. No. 4,579,020; and U.S. patent application Ser. No. 518,746 filed July 29, 1983, now U.S. Pat. No. 4,566,355.

References are also made to the following related applications, each filed by the same applicant as that of the present application and concurrently with the present application: U.S. patent application Ser. No. 581,507, U.S. patent application Ser. No. 581,506, and U.S. patent application Ser. No. 581,509.

BACKGROUND OF THE INVENTION

The present invention relates to a hydraulic control system for an automatic transmission.

Automatic transmissions are known wherein one friction unit is engaged and another friction unit is disengaged to effect a shifting between speed ratios, i.e., between drive ratios. In operating such automatic transmissions, if the engagement of the one friction unit does not take place in good timed relationship with the disengagement of another friction unit, substantial shocks will take place or an engine will be raced. Particularly, a shifting which is to be effected by engaging one multiple plate clutch and disengaging another multiple plate clutch is difficult and substantial shocks are unavoidable because it is very difficult to controllably engage or disengage the clutch at a gradual rate. The substantial shocks take place particularly when a shifting is made from a n+2th speed ratio to a nth speed ratio skipping n+1th speed ratio (where, n is a positive integer) because a difference between an engine revolution speed before the shifting and that after the shifting and a difference between a driving torque before and that after the shifting are big.

SUMMARY OF THE INVENTION

According to the present invention, there is provided a hydraulic control system for an automatic transmission which is shiftable into a nth speed ratio, a n+1th speed ratio and a n+2th speed ratio, the automatic transmission including a first friction unit and a second friction unit, the first friction unit being engaged and the second friction unit being released during operation with the n th speed ratio, the first and second friction units being engaged during operation with the n+1th the speed ratio, the first friction unit being released and the second friction unit being engaged during operation with the n+2th speed ratio, the hydraulic control system comprising:
means for generating an actuating fluid pressure;

a first shift valve having a downshift position thereof and an upshift position thereof, the first shift valve assuming the downshift position thereof during operation with the nth speed ratio, the first shift valve assuming the upshift position thereof during operation with the n+1th speed ratio and the n+2th speed ratio;

a second shift valve having a downshift position thereof and an upshift position thereof, the second shift valve assuming the downshift position thereof during operation with the nth speed ratio and the n+1th speed ratio, the second shift valve assuming the upshift position thereof during operation with the n+2th speed ratio;

the second shift valve having a first port and a second port, the first port being allowed to communicate with the second port when the second shift valve assumes the downshift position thereof, the first port communicating with the first frictional unit;

means for generating a signal fluid pressure; and a changeover valve means responsive to a fluid pressure in the first port for supplying said signal fluid pressure to urge the first shift valve toward the downshift position thereof when the fluid pressure in the first port rises above a predetermined value.

An object of the present invention is to improve an automatic transmission wherein one clutch is engaged and other clutch is disengaged to effect a shifting from a n+2th speed ratio to a nth speed ratio and a friction unit other than the two clutches is engaged during operation with a n+1th speed ratio (where, n is a positive integer) by providing a hydraulic control system wherein a shifting from the n+2th speed ratio to the nth speed ratio is effected without substantial shocks and nor engine racing.

DETAILED DESCRIPTION OF THE INVENTION

Figure 1:
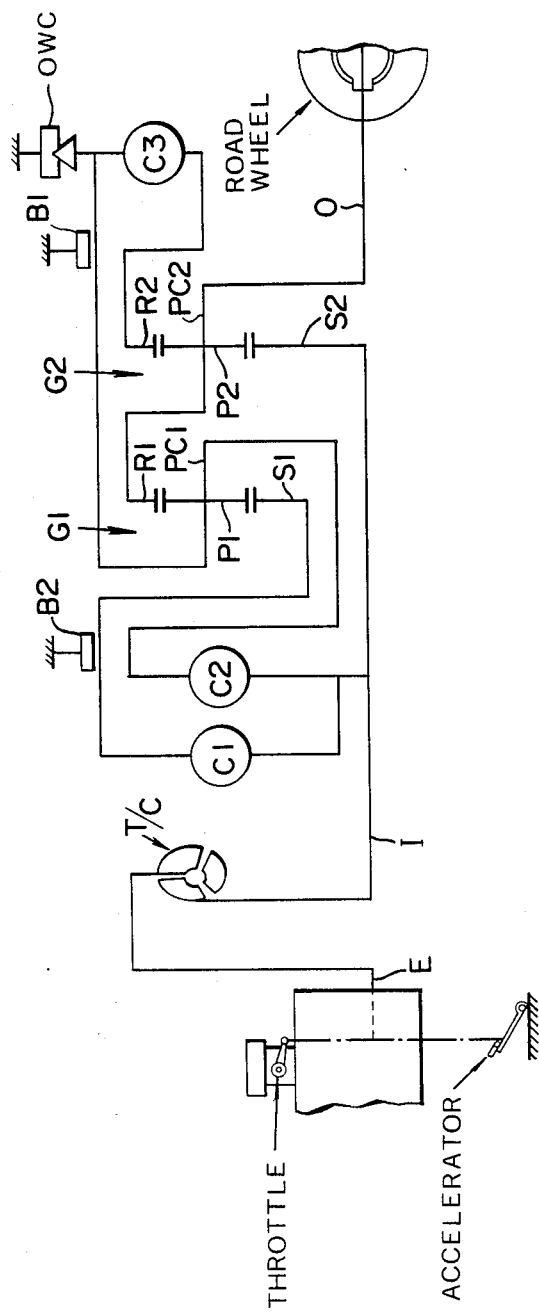
FIG. 1 is a schematic view of a power transmission mechanism of a four speed automatic transmission as illustrated with an engine having a throttle and an accelerator.

Refering to FIG. 1, there is illustrated a power transmission mechanism of a four forward speed and one reverse speed automatic transmission having an overdrive. This power transmission mechanism comprises an input shaft I operatively connected via a torque converter T/C to an engine output shaft E of an engine which has a throttle which opens in degrees, an output shaft O operatively connected to road wheels, only one being shown, via a final drive, not shown. A first planetary gear set G1 and a second planetary gear set G2 are connected between the input and output shafts I and O. A plurality of fluid operated friction units are provided which are made operative and inoperative for producing a plurality of speed ratios between the input shaft I and output shaft O. The fluid operated friction units include a first clutch C1, a second clutch C2, a third clutch C3, a first brake B1, a second brake B2, and a one-way clutch OWC. The first planetary gear set G1 comprises a sun gear S1, and internal gear R1, a carrier PC1 carrying pinion gears P1 meshing simultaneously both the gears S1 and R1. The planetary gear set G2 comprises a sun gear S2, and internal gear R2 and a carrier PC2 carrying pinion gear P2 meshing simultaneously both gears S2 and R2. The carrier PC1 is connectable via the clutch C1 with the input shaft I, and the sun gear S1 is connectable via the clutch C2 with the input shaft I. The carrier PC1 is connectable via the clutch C3 with the internal gear R2. The sun gear S2 is constantly connected with the input shaft I. The internal gear R1 and carrier PC2 are constantly connected with the output shaft O. The brake B1 is arranged to anchor the carrier PC1. The brake B2 is arranged to anchor the sun gear S1. The one-way clutch OWC is so constructed that it allows forward rotation (i.e., the same rotation as that of the engine output shaft E), but prevents reverse rotation (i.e., the rotation opposite to the forward rotation). Thus, it acts as a brake only during reverse rotation.

In the above mentioned power transmission mechanism, the rotational state of each of the rotary elements (S1, S2, R1, R2, PC1, and PC2) of the planetary gear sets G1 and G2 can be varied by actuating selected one or combination of the clutches C1, C2 and C3, brake B1 (one-way clutch OWC) and brake B2, thus varying the revolution speed of the output shaft O relative to that of the input shaft I. The four forward speed ratios and one reverse speed ratio are produced if the clutches C1, C2 and C3 and brakes B1 and B2 are engaged in the manner as shown in the following Table.

TABLE

|  | C1 | C2 | C3 | B1 (OWC) | B2 | Gear Ratio | $\alpha 1 = 0.45$ $\alpha 2 = 0.45$ |
|---|---|---|---|---|---|---|---|
| 1st speed |  |  |  | o | o | $\dfrac{1+\alpha 2}{\alpha 2}$ | 3.22 |
| 2nd speed |  |  | o |  | o | $\dfrac{\alpha 1 + \alpha 2}{\alpha 2(1+\alpha 1)}$ | 1.38 |
| 3rd speed |  | o | o |  |  | 1 | 1 |
| 4th speed |  | o |  |  | o | $\dfrac{1}{1+\alpha 1}$ | 0.69 |
| Reverse | o |  |  |  | o | $-\dfrac{1}{\alpha 1}$ | $-2.22$ |

In the above Table, a sign "o" denotes actuation state of the clurch or brake, $\alpha 1$, and $\alpha 2$ respectively denote ratios of number of teeth of the internal gears R1 and R2 to number of teeth of the corresponding sun gears S1 and S2. A gear ratio is a ratio of the revolution number of the input shaft I to that of the output shaft O. What is denoted by the label (OWC) below the brake B1 means that the first speed ratio is produced owing to the action of the one-way clutch OWC even if the brake B1 is not applied. However, in this first speed ratio, it is not possible for the output shaft O to drive the engine (that is, no engine braking is effected).

Referring to FIGS. 2(a), 2(b), 2(c) and 2(d), a hydraulic control system for the above power transmission mechanism is described.

This hydraulic control system comprises a regulator valve 2, a manual valve 4, a throttle valve 6, a throttle fail safe valve 8, a throttle modulator valve 10, a pressure modifier valve 12, a cut back valve 14, a line pressure booster valve 16, a governor valve 18, a 1-2 shift valve 20, a 2-3 shift valve 22, a 4-3-2 changeover valve 23, a 3-4 shift valve 24, a 2-4 timing valve 26, a 2-3 timing valve 28, a 3-4 timing valve 30, a 3-2 timing valve 32, a first manual range pressure reducing valve 34, a torque converter pressure reducing valve 36, a 1-2 accumulator 38, a 4-3 accumulator 40, and an overdrive inhibitor solenoid 42. These valves are interconnected as shown in FIGS. 2(a), 2(b), 2(c) and 2(d), and connected with an oil pump O/P, the torque converter T/C, clutches C1, C2, C3 and brakes B1, B2 as shown. The brake B2 has a servo apply chamber S/A i.e., an oil presure chamber designed to apply the brake when pressurized, and a servo release chamber S/R, i.e., an oil pressure chamber designed to release the brake when pressurized. Since the servo release chamber S/R has a larger pressure acting area than a pressure acting area of the servo apply chamber S/A, the brake B2 is released when the pressure is supplied to the servo release chamber S/R irrespective of the supply of oil pressure to the servo apply chamber S/A. The overdrive inhibitor solenoid 42 is electrically connected with an overdrive inhibitor switch SW.

The hydraulic control system is substantially the same as a prior proposed hydraulic control system disclosed in copending U.S. Pat. Appln. Ser. No. 518,413 filed on July 29, 1983 by Kazuhiko SUGANO. This copending application is incorporated hereby by reference in its entirety. Particularly, attention is directed to FIGS. 2(a), 2(b) and 2(c) and the description along therewith.

The hydraulic control system of the present application is different from the prior proposed hydraulic control system in that the 4-3-2 changeover valve 23 is fluidly disposed in a fluid conduit 424 leading from the throttle modulator valve 10 so as to selectively supply a throttle modulator pressure to a port 122d, i.e., a hystersis port, of the 2-3 shift valve 22 as opposed to the prior proposed hydraulic control system wherein the port 122d of the 2-3 shift valve 22 is always connected to the oil conduit 424 leading from the throttle modulator valve 10 to receive the throttle modulator pressure.

Figure 2:
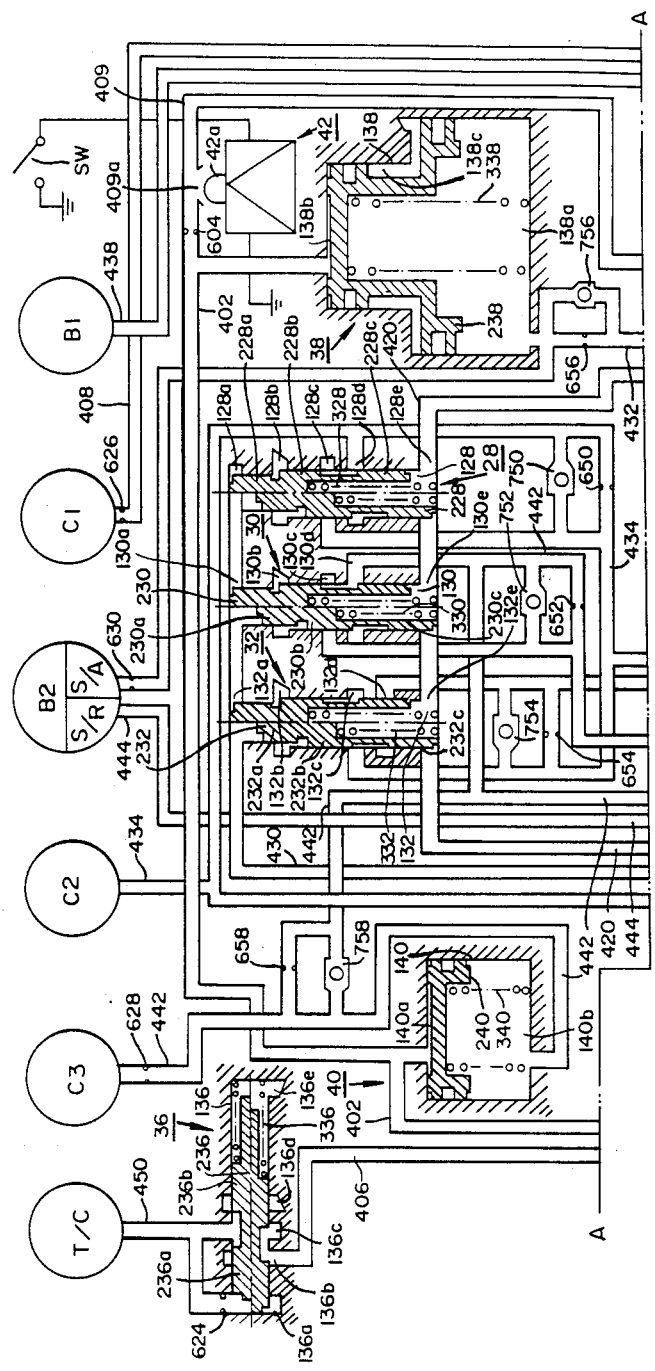
FIGS. 2(a), 2(b), 2(c) and 2(d), when combined, illustrate an embodiment of a hydraulic control system for the automatic transmission according to the present invention.
Figure 2B:
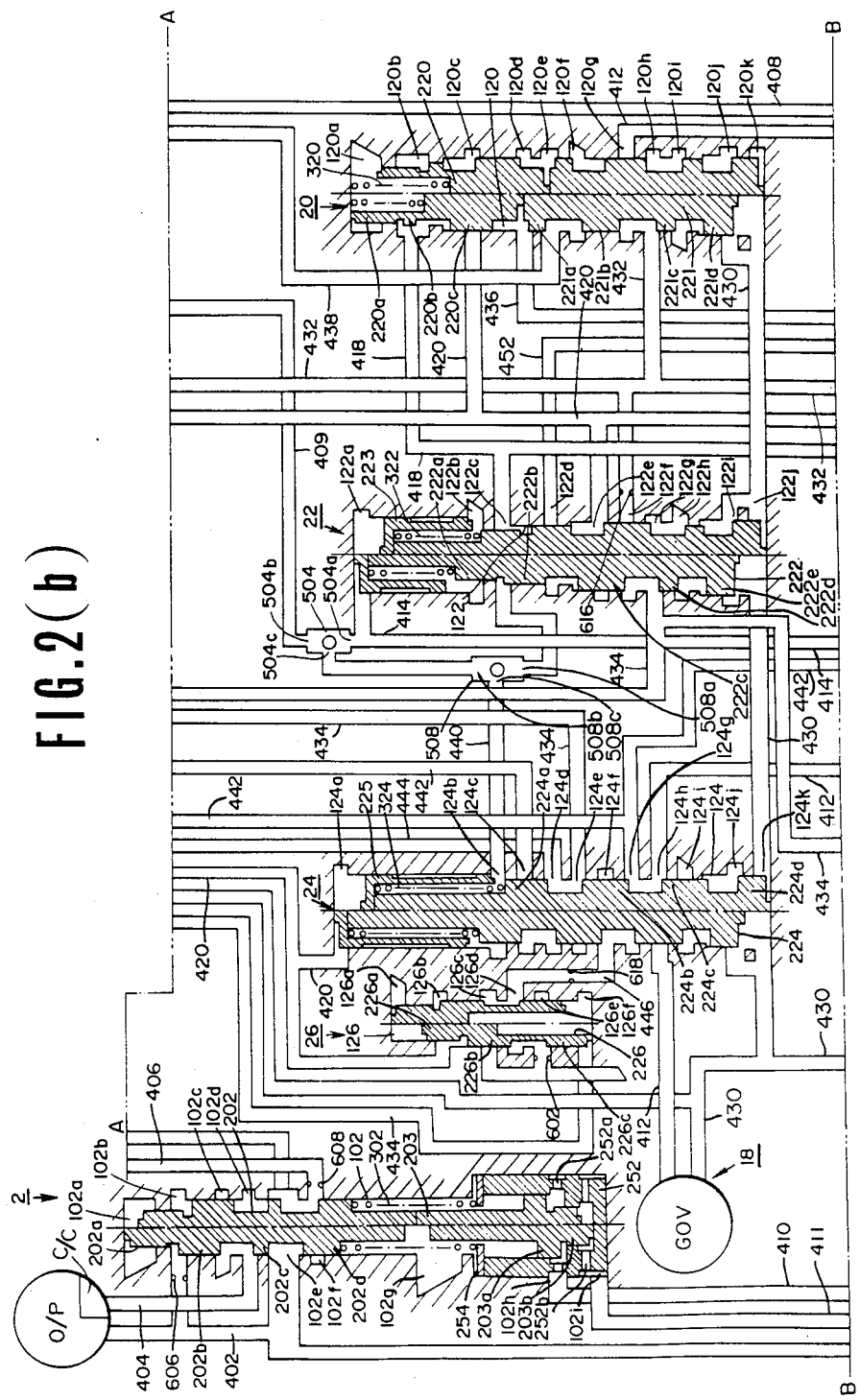
Figure 2D:
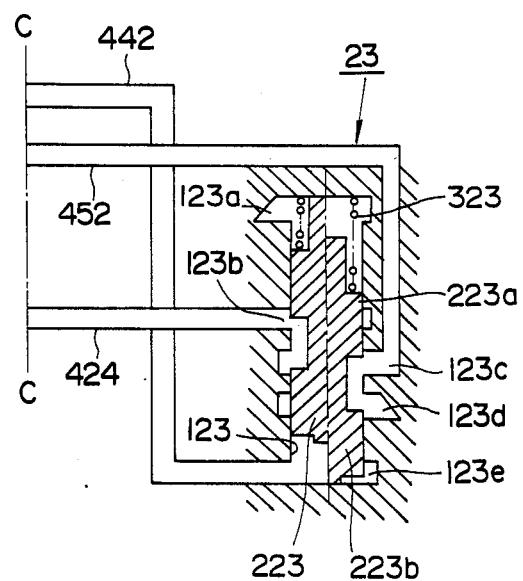

Referring to FIG. 2(d), the 4-3-2 changeover valve 23 comprises a valve bore 123 formed with four ports 123a to 123e, a spool 223 having formed thereon two lands 223a and 223b slidably disposed in the valve bore 123, and a spring 323 biasing the spool 223 downward as viewed in FIG. 2(d). The port 123a is a drain port. The port 123b is conAected with an oil conduit 424 leading from the throttle modulator valve 10. The port 123c is conected with an oil conduit 452 leading to the port 122d of the 2-3 shift valve 22. The port 123d is a drain port. The port 123e is connected with an oil conduit 442 leading from a port 124g of the 3-4 shift valve 24. When the spool 223 assumes a down position thereof as indicated by the right half thereof as viewed in FIG. 2(d), the oil conduit 452 is drained and no pressure acts in the port 122d of the 2-3 shift valve 22. When the oil pressure in the port 123e is higher than a predetermined value, the spool 223 assumes an up position thereof as indicated by the left half thereof as viewed in FIG. 2(d). When the spool 223 assumes the up position thereof, the oil conduit 452 is allowed to communicate with the oil conduit 424, thus allowing the throttle modulator pressure to act in the port 122d of the 2-3 shift valve 22.

Figure 3:
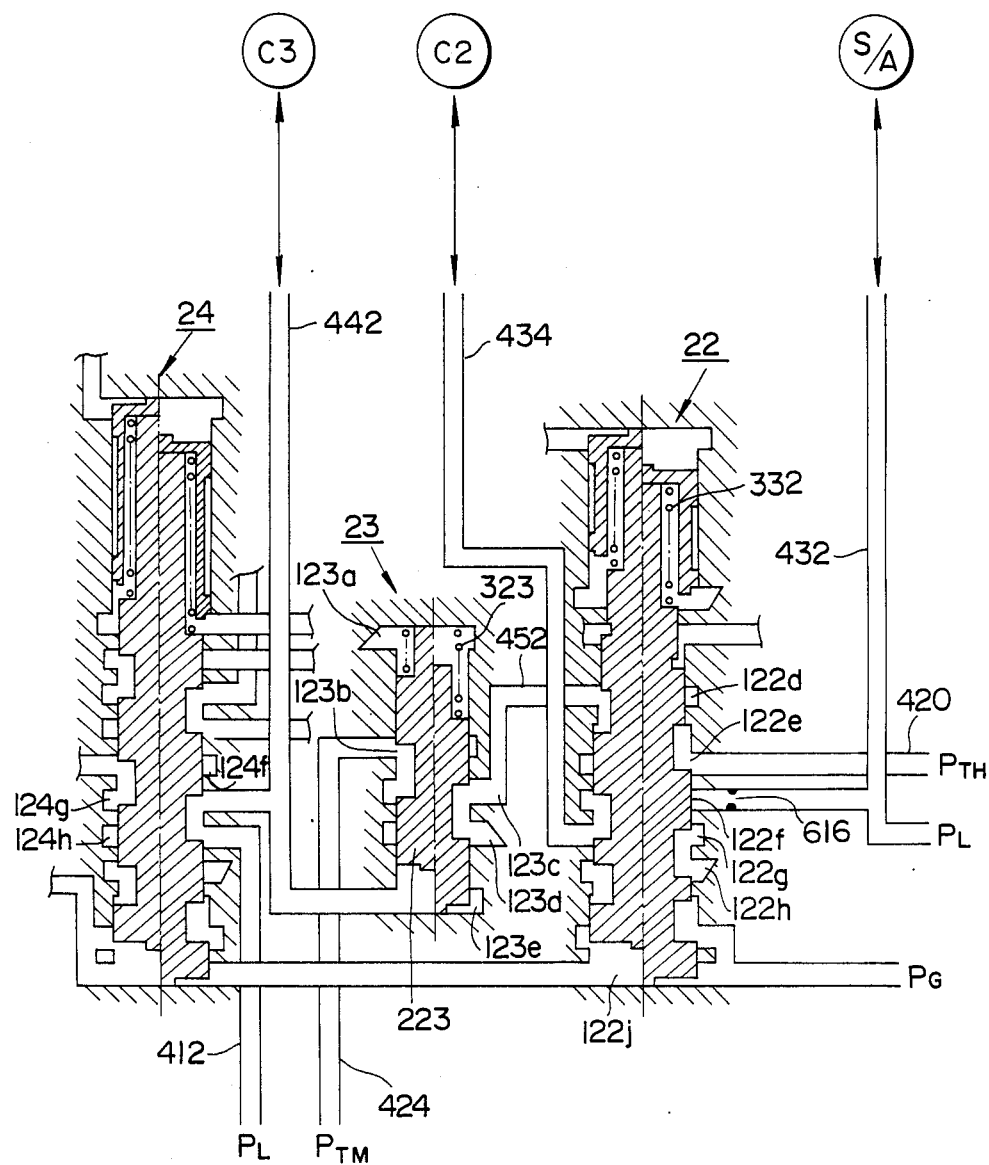
FIG. 3 is a diagram illustrating the embodiment shown in FIGS. 2(a), 2(b), 2(c) and 2(d) in a simplified manner.

For ease of understanding the feature of the present invention, the following description proceeds along with FIG. 3 wherein the 4-3-2 changeover valve 23 is illustrated with the 2-3 shift valve 22 and the 3-4 shift valve 24.

As shown in FIG. 3, the port 122f of the 2-3 shift valve 22 (a first shift valve) is connected via an orifice 616 to an oil conduit 432 which is supplied with a line pressure when the 1-2 shift valve 20 (not shown in FIG. 3) assumes the upshift position thereof. The port 122f of the 2-3 shift valve 22 is allowed to communicate with a port 122g thereof when the 2-3 shift valve 22 assumes the upshift position thereof. This port 122g is connected via an oil conduit 434 with the clutch C2. A port 122d of the 2-3 shift valve 22 is connected via an oil conduit 452 with the port 123c of the 4-3-2 changeover valve 23. A port 122e of the 2-3 shift valve 22 is connected with an oil conduit 420 which serves as the throttle pressure circuit. A port 124h of the 3-4 shift valve 24 (a second shift valve is connected to an oil conduit 412 which is supplied with the line pressure during forward drive ranges, and this port 124h is allowed to communicate with the port 124g when the 3-4 shift valve 24 assumes the downshift position thereof (a position indicated by the right half thereof as viewed in FIG. 3). This port 124g is connected via an oil conduit 442 with the clutch C3. The port 123b of the 4-3-2 changeover valve 23 is connected with the oil conduit 424 which serves as a circuit for the throttle modulator pressure PTM (a pressure variable with the throttle pressure PTH but slightly lower than the latter). The port 123c is conneced with the before mentioned oil conduit 452, a port 123d is a drain port, and a port 123e is connected with the oil conduit 442.

Next, the operation is described.

The 4-3-2 changeover valve 23 stays in the down position thereof as indicated by the right half thereof as viewed in FIG. 3 when no pressure acts in the port 123e. As the port 123e is connected with the clutch C3, the 4-3-2 changeover valve 23 assumes the up position thereof only when the clutch C3 is engaged. When the 4-3-2 changeover valve 23 assumes the up position thereof, the oil conduit 452 is allowed to communicate with the oil conduit 424 via the ports 123b and 123c, thus allowing the throttle modulator pressure PTM to act in the port 122d of the 2-3 shift valve 22. This state is substantially the same as the state established in the prior proposed hydraulic system. That is, shiftings between the 1st, 2nd and 3rd speed ratios are effected in an ordinary manner. Regarding shiftings between the 3rd and 4th speed ratios, the 4-3-2 changeover valve 23 does not play any role in effecting such shiftings and thus provides no influence because they take place irrespective of the state which the 2-3 shift valve 22 is subject to. Regarding 2-4 shifting, no role is played by the 4-3-2 changeover valve because it changes its position after the shifting has been completed. Therefore, the 4-3-2 changeover valve 23 plays a role only during 4-2 shifting.

Next, a 4-2 shifting is described. During the 4-2 shifting, the 3-4 shift valve 24 shifts from the upshift position thereof as indicated by the left half thereof as viewed in FIG. 3 to the downshift position thereof as indicated by the right half thereof as viewed in FIG. 3. As a result, the port 124g of the 3-4 shift valve 24 is allowed to communicate with the port 124h. However, the 2-3 shift valve 22 is prevented from shifting toward the downshift position thereof for a predetermined period of time by means of the 4-3-2 changeover valve 23. That is, as the clutch C3 is released in the 4th speed ratio state, the 4-3-2 changeover valve 23 assumes the down position as indicated by the right half thereof as viewed in FIG. 3, thus closing the communication between the oil conduits 424 and 452. Therefore, since the throttle modulator pressure PTM does not act in the hysteresis port 122d of the 2-3 shift valve 22, the only force which urges the 2-3 shift valve 22 toward the downshift position thereof is a force due to the spring 332, and thus the 2-3 shift valve 22 does not shift to the downshift position thereof even though the governor pressure PG acting in the port 122j has become low. When the clutch C3 is engaged (i.e., after the 3rd speed ratio has been established) as a result of shifting of the 3-4 shift valve 24 from the upshift position thereof to the downshift position thereof, the 4-3-2 changeover valve 23 shifts to the up position thereof, allowing the oil conduit 424 to communicate with the oil conduit 452, thus allowing the throttle modulator pressure PTM to act in the port 122d of the 2-3 shift valve 22. As a result, the 2-3 shift valve 22 shifts to the downshift position thereof immediately, allowing the oil pressure to be drained from the port 122h, thus releasing the clutch C2 so as to establish the 2nd speed ratio. Accordingly, when the 4-2 shifting is demanded, the shifting from the 4th speed ratio to the 3rd speed ratio is effected and then the shifting from the 3rd speed ratio to the 2nd speed ratio is effected immediately after the 3rd speed ratio has been established. Since the brake B2 is released upon shifting from the 4th speed ratio to the 3rd speed ratio and then engaged upon shifting from the 3rd speed ratio to the 2nd speed ratio, the band servo of the brake B2 is actuated and thus the shifting timing can be adjusted relatively easy, thus suppressing shocks during the shifting as compared to the case during direct shifting from the 4th speed ratio to the 2nd speed ratio. A difference between an engine revolution speed before and that after 4-3 shifting and a difference between an engine revolution speed before and that after 3-2 shifting and a difference between a torque before and that after 4-3 shifting and a difference between a torque before and that after 3-2 shifting are small as compared to those for direct 4-2 shifting, thus contributing to reduction in shocks during shifting. Besides, there is no side effect owing to the provision of the 4-3-2 changeover valve 23.

It will now be understood that, according to the present invention, the n+1th speed ratio is temporarily established during shifting from the n+2th speed ratio to the nth speed ratio so as to avoid the substantial shocks or engine racing during the shifting.

I claim:

1. A hydraulic control system for an automatic transmission which is shiftable into a nth speed ratio, a n+1th speed ratio and a n+2th speed ratio, the automatic transmission including a first friction unit and a second friction unit, the first friction unit being engaged and the second friction unit being released during operation with the nth speed ratio, the first and second friction units being engaged during operation with the n+1th speed ratio, the first friction unit being released and the second friction unit being engaged during operation with the n+2th speed ratio, the hydraulic control system comprising:
means for generating an actuating fluid pressure;
a first shift valve having a downshift position thereof and an upshift position thereof, said first shift valve assuming the downshift position thereof during operation with the nth speed ratio, said first shift valve assuming the upshift position thereof during operation with the n+1th speed ratio and the n+2th speed ratio;

a second shift valve having a downshift position thereof and an upshift position thereof, said second shift valve assuming the downshift position thereof during operation with the nth speed ratio and the n+1th speed ratio, said second shift valve assuming the upshift position thereof during operation with the n+2th speed ratio;

said second shift valve having a first port and a second port, said first port being allowed to communicate with said second port when said second shift valve assumes the downshift position thereof, said first port communicating with the first friction unit, said second port communicating with said actuating fluid pressure generating means;

means for generating a signal fluid pressure; and a changeover valve means communicating with said first port and responsive to a fluid pressure in said first port for supplying said signal fluid pressure to urge said first shift valve toward the downshift position thereof when the fluid pressure in said first port rises above a predetermined value.

2. A hydraulic control system as claimed in claim 1, wherein said first shift valve has a signal pressure port communicating with said changeover valve means for receiving said signal fluid pressure supplied thereto, and a pressure acting area subject to said signal fluid pressure supplied to said signal pressure port only when said first shift valve assumes the upshift position thereof.

3. In an automatic transmission which is shiftable between a nth speed ratio, a n+1th speed ratio, and a n+2th speed ratio:

power transmission mechanism means including a first friction unit and a second friction unit, said power transmission mechanism means being operable to establish the nth speed ratio where said first friction unit is engaged and said second friction unit is released, to establish the n+1th speed ratio where the first and second friction units are engaged, and to establish the n+2th speed ratio where the first friction unit is released and the second friction unit is engaged, whereby said first friction unit is engaged during a shifting the n+2th speed ratio to either the n+1th speed ratio or the nth speed ratio;

a first shift valve having a valve spool movable between a downshift position and an upshift position, said valve spool assuming the downshift position thereof during operation with the nth speed ratio and the upshift position thereof during operation with the n+1th speed and n+2th speed ratio;

a second shift valve having a valve spool movable between a downshift position and an upshift position, said valve spool of said second shift valve assuming the downshift position thereof during operation with the nth speed ratio and n+1th speed ratio, and the upshift position thereof during operation with the n+2th speed ratio;

means responsive to the engagement of said first friction unit for exerting a hydraulic bias to said valve spool of said first shift valve in a direction toward the downshift position thereof only when said valve spool of said first shift valve assumes the upshift position thereof, but responsive to the disengagement of said first friction unit for removing said hydraulic bias from said valve spool of said first shift valve, whereby during a shifting involving the engagement of the first friction unit from the disengagement of said first friction unit, said hydraulic bias exerting means delays the application of said hydraulic bias to said valve spool of said first shift valve until the engagement of said first friction unit.

4. An automatic transmission as claimed in claim 3, wherein said first shift valve has a signal pressure port and said valve spool of said first shift valve is formed with a pressure acting area exposed to said signal pressure port only when said valve spool of said first shift valve assumes the upshift position thereof, and wherein said hydraulic bias exerting means includes means for generating a signal fluid pressure and communicating with said signal pressure port of said first shift valve, and a changeover valve fluidly disposed between said signal fluid pressure generating means and said signal pressure port, said changeover valve having a port communicating said first friction unit to receive the hydraulic fluid pressure supplied to said first friction unit, a drain port, and a pressure responsive spool means for connecting said signal pressure port of said first valve to said drain port responsive to the hydraulic fluid pressure supplied to said first friction unit.

* * * * *